Feb. 17, 1942. R. W. DINZL 2,273,516
INJECTION MOLDING MACHINE
Filed Dec. 12, 1940 2 Sheets-Sheet 1
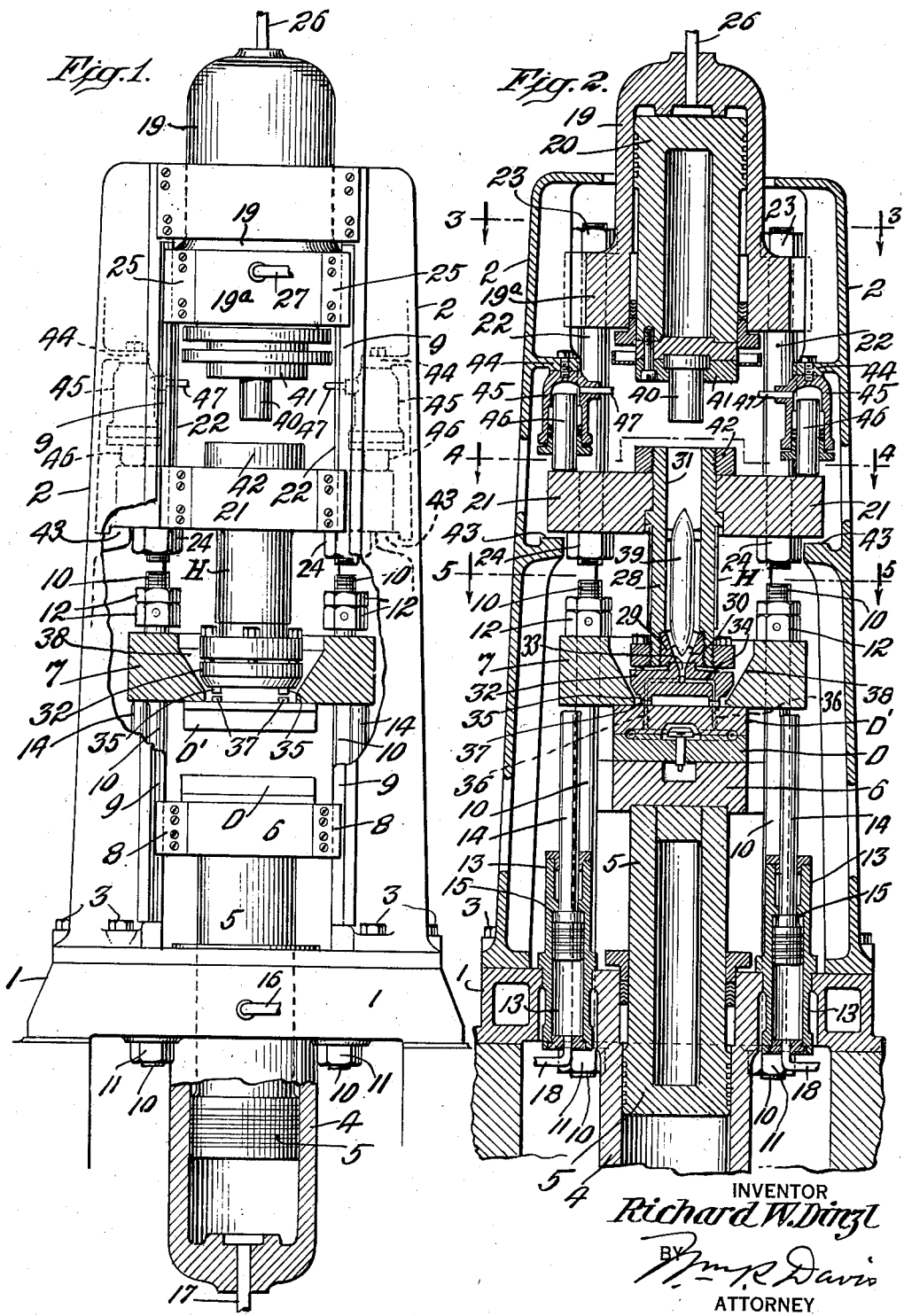
INVENTOR
Richard W. Dinzl
BY
ATTORNEY

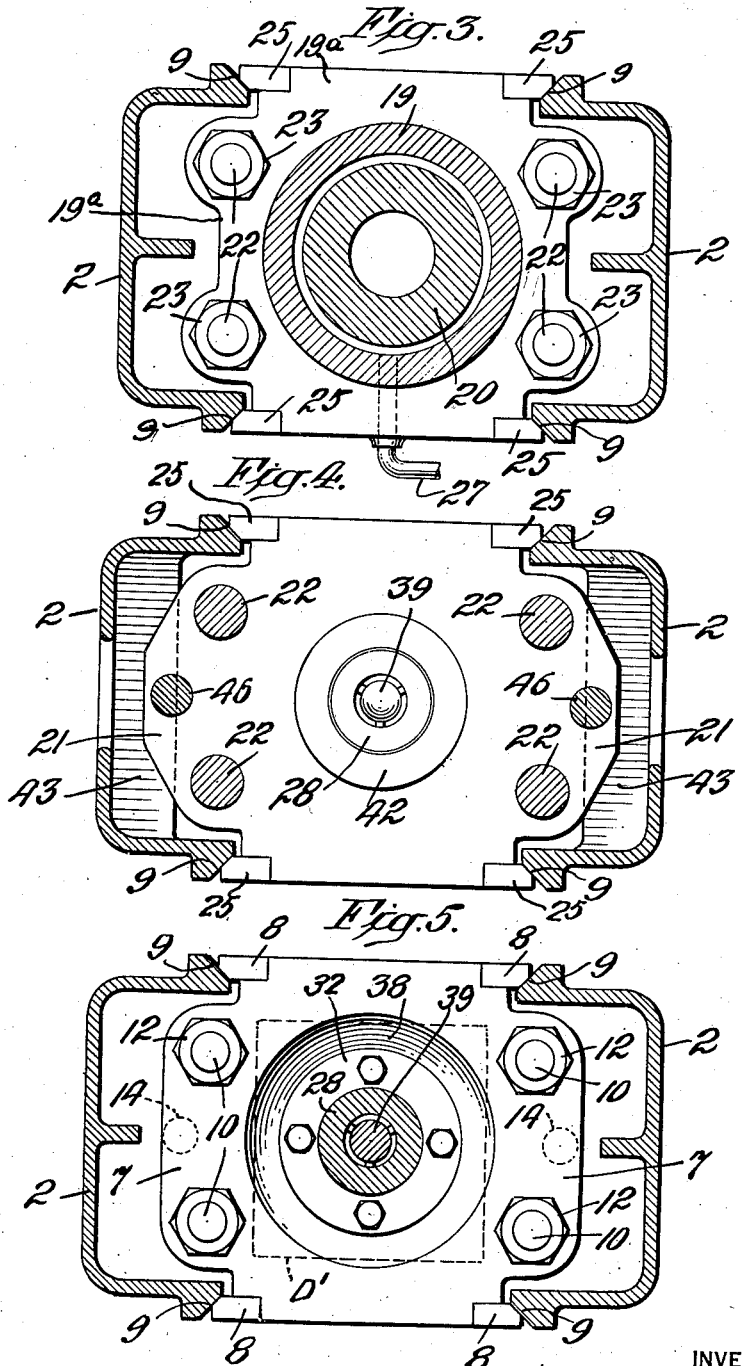

Patented Feb. 17, 1942

2,273,516

UNITED STATES PATENT OFFICE 2,273,516

INJECTION MOLDING MACHINE

Richard W. Dinzl, Westfield, N. J., assignor to The Watson-Stillman Co., Roselle, N. J., a corporation of New Jersey Application December 12, 1940, Serial No. 369,709

8 Claims. (Cl. 18—30)

Machines for injecting molding of thermoplastic materials commonly have an injection device and a hydraulic device including a power cylinder and a ram advanceable by hydraulic pressure to move and clamp one molding die against another to form a closed mold and then move the mold into sealed contact with the injection device for charging the mold. This sealed contact is thus effected by the power which clamps the dies together. Since this power must be quite great in order to resist separation of the dies by injection, of the material into the mold under high pressure, the power is materially in excess of that required for effecting said sealed contact. Consequently it is customary to provide for counterbalancing said power to avoid crushing strain upon the sealed delivery connection between the injection device and the mold.

Important objects of the present invention are to provide an improved injection molding machine designed to obtain a desired safe sealing pressure at said delivery connection by means other than the power means employed for closing and clamping the dies, and to provide such a machine wherein the die closing and clamping means and the injection device are embodied in separate units and one of said units is shiftable bodily relatively to the other to effect said sealed delivery connection. Other objects of the invention will appear hereinafter.

In the drawings,

Fig. 1 is a sectional elevation of the machine with the injection ram and the die closing ram both retracted;

Fig. 2 is a vertical sectional view of the machine showing it operated to clamp the dies together and also effect a pressure-sealed delivery connection between the injector and the mold;

Fig. 3 is a horizontal section on the line 3—3 of Fig. 2;

Fig. 4 is a horizontal section on the line 4—4 of Fig. 2; and

Fig. 5 is a horizontal section on the line 5—5 of Fig. 2.

The machine includes a base 1 and a rigid vertical frame structure 2 bolted to the base, as at 3. The base supports the die closing and clamping unit in a fixed position and the frame structure slidably supports the injection unit above the die closing unit.

The die closing and clamping unit includes a vertical hydraulic cylinder 4 formed with the base and extending downward from the center thereof. A ram 5 is reciprocable within the cylinder and bears a platen 6 upon its upper end. Above said platen there is an opposed, vertically slidable platen 7. Said platens have, at their corners, guides 8 slidably engaged with four vertical guide tracks 9 borne by the frame structure. The base bears four vertical strain rods 10 extending through bores in the platen 7 and having abutments resting upon the upper side of the base, and threaded shanks extending downward through bores in the base. Nuts 11 are screwed upon the lower ends of said shanks to anchor the strain rods rigidly to the base. Nuts 12 are screwed upon the upper ends of the strain rods, above the platen 7. At opposite sides of the cylinder 4 and centrally located between the strain rods there are two vertical hydraulic cylinders 13 rigidly secured to the base. These cylinders are small in comparison with the cylinder 4 and each has an elongated ram 14 reciprocable therein. Platen 7 normally rests upon the upper ends of these rams, and the small cylinders have stops 15 limiting upward movement of the rams 14. These stops are so located that when the rams are in engagement with them the platen 7 will be supported in an elevated position a short distance below the anchor nuts 12 at the upper ends of the strain rods. Hydraulic connections 16 and 17 lead to the large cylinder 4 to supply pressure thereto for reciprocating the ram 5, and hydraulic connections 18 lead to the lower ends of the smaller cylinders 12. A molding die D is secured to the upper side of platen 6, and a companion molding die D' is secured to the under side of platen 7.

The injection unit includes a vertical hydraulic cylinder 19 coaxial with the cylinder 4 of the die-closing unit and having a ram 20 reciprocable through its lower end. Below cylinder 19 there is a cross plate or block 21 rigidly connected to said cylinder by four vertical strain rods 22. These rods have an enlarged medial portion and threaded shanks at the ends thereof. The upper shanks extend through bores in a flange 19ª formed on the lower end of cylinder 19 and have nuts 23 screwed thereon above said flange. The lower shanks extend through bores in the block 21 and have nuts 24 screwed upon them beneath 21 and the nuts 23 and 24 hold the cylinder flange and the block 21 tight against the abutments provided by the enlarged portion of the strain rods. Thereby the cylinder and block are held in a definite spaced relation to each other. The cylinder flange and the block have, at their corners, guides 25 slidably engaging the vertical guide tracks 9. Cylinder 19 has hydraulic connections 26 and 27 to supply it with pressure for reciprocating the ram 20.

Block 21 has a central bore in which a vertical injection cylinder 28 is rigidly secured in a position coaxial with the cylinders 4 and 19. The injection cylinder extends downward from the block. An injector nozzle 29 is secured to the lower end of the injection cylinder and has a discharge port 30 tapering downward from the bore 31 of the cylinder. The cylinder 28 is flanged at its lower end and has bolted thereto a charge distributor 32 comprising a block having a central inlet bore 33 in sealed connection with port 30, and distributing bores 34 radiating from said inlet bore and in delivery connection respectively with a plurality of injector nozzles 35 screwed into the under side of the distributor block. These nozzles have flat lower ends all in a common horizontal plane and are in vertical alinement with mold gates 36 opening upward through bosses 37 at the upper side of the die D'. These bosses are flat at the top and are also in a common horizontal plane to abut the nozzles 35. The platen 7 has a central opening 38 receiving the charge distributor and providing clearance for said bosses to come into contact with the nozzles 35. The injection cylinder may be surrounded by the usual heating means H and the bore of the cylinder contains a torpedo 39 to spread the molding material within the cylinder into contact with the wall of the heated cylinder bore.

An injection plunger 40, to extrude the molding material from the injection cylinder, is mounted upon the lower end of ram 20. This plunger is surrounded at its upper end by a flat, downwardly facing stop surface 41. A stop plate 42 at the upper side of block 21 has a threaded bore and is screwed upon a threaded upper end of the injection cylinder. This plate has a flat upper surface engageable by the plunger stop surface 41 to limit advance of the plunger into the bore of the injection cylinder. When the ram 20 is fully retracted the plunger will be withdrawn to a position spaced above the injection cylinder so that the bore of the latter may be charged by feeder means, not shown.

Cylinder 19, ram 20, block 21, strain rods 22, injection cylinder 28, charge distributor 32 and its nozzles, plunger 40 and stop plate 42 all are parts of the injector unit and, as previously described, this unit is mounted for vertical sliding. The frame structure 2 is formed with upwardly facing abutments 43 upon which the block 21 normally rests to support said unit in its lowermost position. The level of said abutments is so correlated with the level of the upper ends of the platen supporting rams 14 when the latter are fully projected, and with the injector nozzles 35 and bosses 36 that, when said unit is supported by the abutments 43, the said nozzles will be spaced from said bosses and the space therebetween will be less than the space between the platen 8 and the nuts 12 upon the lower strain rods 10.

Above the block 21 and at opposite sides of the axis of the ram 20, the frame structure 2 is formed with a pair of downwardly facing reaction abutments 44. A pair of hydraulic cylinders 45 are secured to the under side of these abutments and have rams 46 reciprocable through their lower ends and adapted to bear downwardly upon the block 21. The cylinders 45 are small in comparison with the cylinders 4 and 19 and are located midway between the adjacent strain rods 22. Each cylinder has a hydraulic connection 47 leading to its upper end.

The machine is operated as follows: The injection cylinder 28 is charged with thermoplastic material in granular form and the material is plasticized in the heated cylinder. Hydraulic pressure is admitted to the lower end of the lower cylinder 4 to elevate the ram 5 and the die D and bring said die into contact with die D' to close a mold formed by said dies. Further elevation of the ram raises both dies and the platen 8 and brings the mold gate bosses 37 into contact with the injection nozzles 35 so that, as the ram 5 continues to rise, the thrust thereof is transmitted through said bosses and nozzles to the charge distributor 32 and the injection cylinder 28 and the block 21 to raise the injection unit bodily off the abutments 43. Upward movement of the ram 5 is stopped by the platen 7 coming into contact with the anchor nuts 12 on the strain rods 10. These nuts and the platen 7 then cooperate with the ram 5 to clamp the dies together. Hydraulic pressure is admitted to the small cylinders 45 to cause the rams 46 to exert a downward thrust upon the block 21 and thereby force the injection nozzles 35 into tight, sealing contact with the mold gate bosses 37 by both the weight of the injection unit and the hydraulic pressure in the cylinders 45. Hydraulic pressure is then admitted to the upper end of the upper cylinder 19 and relieved at the lower end of the cylinder to advance the ram 20 and plunger 40 downward to eject a molding charge from the injection cylinder 28 and through the charge distributor 32 and the nozzles 35 to the mold.

At the conclusion of the molding operation hydraulic pressure is admitted to the lower end of the upper cylinder and relieved in the upper end of the cylinder to retract the ram 20 and plunger 40. The lower ram 5 is retracted by admission of hydraulic pressure to the upper end of cylinder 4 and relief of pressure at the lower end thereof. As the ram descends, the dies D and D', the platen 7 and the injection unit at first all descend with the ram. When the block 21 of said unit reaches the abutments 43 the unit comes to rest and further descent of ram 5 lowers the platen 7 away from the nuts 12 and allows the platen to come to rest upon the upper ends of the rams 14, hydraulic pressure being maintained in the small lower cylinders 13 to keep said rams elevated. Continued descent of ram 5 retracts die D from die D' to open the mold for ejection of the molded product by the usual knock-out mechanism.

When servicing of the charge distributor 32 and the injection cylinder 28 is required, hydraulic pressure in the small lower cylinders 15 is relieved and the rams 14 then permit the platen to gravitate to a position clear of the distributor and injection cylinder for ready access thereto.

It will be seen that the invention avoids transmission of the powerful die-clamping thrust of the ram 5 to the nozzles of the injector with possible crushing strain thereon. This powerful thrust is resisted by the reaction nuts 12 and the strain rods 10. A safe sealing pressure is transmitted to said nozzles by the weight of the floating injector unit and the thrust of the small rams 46. The embodiment of the injector device and the die closing and clamping device in separate units also enables them to have their own separate strain rods of appropriate strength and enables servicing or replacement of the rods and nuts of one unit without disturbing those of the other unit.

What I claim is:

1. An injection molding machine including a mold-charging injection device comprising a vertically disposed injection cylinder and plunger and means for operating the plunger, a platen to support a molding die beneath said injection device in vertical axial alignment with said device and in opposed relation thereto, means supporting said device and platen in said relation to each other and supporting them also for vertical shifting individually, abutment means to limit downward shift of the injection device, abutment means to limit downward shift of said platen and so vertically located that downward shift of the platen thereto will break a charge delivery connection between said dies and injection device when the latter is engaged with its said abutment means, a mold-closing device to support and lift a companion die against said first die for mold closure and then lift both dies and through the dies lift said platen, effect a delivery connection between the platen-borne die and the injection device and by thrust through said delivery connection lift the injection device bodily from its supporting abutment means for sealing said connection, fluid pressure means to exert downward force upon the injection device for pressure-sealing of said delivery connection, and abutment means to limit upward movement of the platen and cooperate with said mold-closing device to clamp the dies together.

2. An injection molding machine including a mold-charging injection device comprising a vertically disposed injection cylinder and plunger, a platen to support a molding die beneath said injection device in vertical axial alignment with said device and in opposed relation thereto, means supporting said device and platen in said relation to each other and supporting them also for vertical shifting individually, abutment means to limit downward shift of the injection device, abutment means to limit downward shift of said platen and so vertically located that downward shift of the platen thereto will break a charge delivery connection between said dies and injection device when the latter is engaged with its said abutment means, a mold-closing device to support and lift a companion die against said first die for mold closure and then lift both dies and through the dies lift said platen, effect a delivery connection between the platen-borne die and the injection device and by thrust through said delivery connection lift the injection device bodily from its supporting abutment means for sealing said connection, and abutment means to limit upward movement of the platen and cooperate with said mold-closing device to clamp the dies together.

3. An injection molding machine including a mold-charging injection device comprising a vertically disposed injection cylinder and plunger, a platen to support a molding die beneath said injection device in vertical axial alignment with said device and in opposed relation thereto, means supporting said device and platen in said relation to each other and supporting them also for vertical shifting individually, abutment means to limit downward shift of the injection device, vertically shiftable abutment means to limit downward shift of said platen, fluid pressure means to normally hold said last-mentioned abutment means so vertically located that downward shift of the platen thereto will break a charge delivery connection between said dies and injection device when the latter is engaged with its said abutment means, said fluid pressure means being operable to lower said abutment means and platen, for the purpose set forth, a mold-closing device to support and lift a companion die against said first die for mold closure and then lift both dies and through the dies lift said platen, effect a delivery connection between the platen-borne die and the injection device and by thrust through said delivery connection lift the injection device bodily from its supporting abutment means, for sealing said connection, and abutment means to limit upward movement of the platen and cooperate with said mold-closing device to clamp the dies together.

4. An injection molding machine including a mold-charging injection device comprising a vertically disposed injection cylinder and plunger and means for operating the plunger, a platen to support a molding die beneath said injection device in vertical axial alignment with said device and in opposed relation thereto, means supporting said device and platen in said relation to each other and supporting them also for vertical shifting individually, abutment means to limit downward shift of the injection device, vertically shiftable abutment means to limit downward shift of said platen, fluid pressure means to normally hold said last-mentioned abutment means so vertically located that downward shift of the platen thereto will break a charge delivery connection between said dies and injection device when the latter is engaged with its said abutment means, said fluid pressure means being operable to lower said abutment means and platen, for the purpose set forth, a mold-closing device to support and lift a companion die against said first die for mold closure and then lift both dies and through the dies lift said platen, effect a delivery connection between the platen-borne die and the injection device and by thrust through said delivery connection lift the injection device bodily from its supporting abutment means, for sealing said connection, fluid pressure means to exert downward force upon the injection device for pressure-sealing of said delivery connection, and abutment means to limit upward movement of the platen and cooperate with said mold-closing device to clamp the dies together.

5. An injection molding machine including an injection unit comprising an injection cylinder and plunger, fluid pressure means comprising a cylinder and ram for reciprocating said plunger, a cross plate to which said injection cylinder is secured, and strain rods connecting together said fluid pressure cylinder and said cross plate to hold the injection cylinder against movement away from the fluid pressure cylinder under the injection thrust; a die-closing and clamping unit comprising a platen to bear a molding die, fluid pressure means to move a companion molding die toward and from the first die to open and close a mold formed by the dies and comprising a cylinder and a ram to move said companion die, strain rods connecting together the last-mentioned fluid pressure cylinder and said platen to hold the platen against movement away from the cylinder by the die-clamping thrust of the last-mentioned ram; means supporting said units in endwise opposed relation with their said cylinders in axial alinement and supporting the first unit for movement toward and from the second unit; and fluid pressure means for forcing the first unit toward the second unit to effect a sealed delivery connection between the injection cylinder and the mold.

6. An injection molding machine according to claim 5, characterized in that the machine includes a base supporting the die-closing and clamping unit with its cylinder axis vertical, a frame structure borne by said base and supporting the injection unit for vertical sliding above the die-closing and clamping unit, and abutment means borne by said frame structure to limit downward movement of the injection unit.

7. An injection molding machine including an injection unit comprising an injection cylinder, a ram for ejecting molding material from said cylinder, means cooperating with said ram to define a chamber for fluid pressure for advance of the ram, and means anchoring together said injection cylinder and said means which cooperate with the ram to define said chamber to hold said cylinder positively against advance under ejection thrust of the ram; a die closing and clamping unit comprising a platen to support a molding die in axial alignment with said cylinder and in opposed relation thereto, a device to advance and clamp a companion die against the first-mentioned die, and means anchoring together said second-mentioned device and said platen to hold the latter against advance by the mold-clamping force of the device; and means supporting said units in opposed relation and supporting the injection unit for shift bodily axially of the injection cylinder relatively to the other unit to effect a sealed delivery connection between the injection cylinder and the mold.

8. An injection molding machine according to claim 7, characterized in that the machine includes fluid-pressure means for forcing the injection unit toward the other unit to effect said sealed delivery connection.

RICHARD W. DINZL.